(12) United States Patent
Tucker

(10) Patent No.: US 9,629,760 B1
(45) Date of Patent: Apr. 25, 2017

(54) WHEELCHAIR AND WHEELCHAIR DOCKING SYSTEM FOR HUMAN TRANSPORT IN MOTORIZED VEHICLES

(71) Applicant: Curt Tucker, Saginaw, MI (US)

(72) Inventor: Curt Tucker, Saginaw, MI (US)

( * ) Notice: Subject to any disclaimer, the term of this patent is extended or adjusted under 35 U.S.C. 154(b) by 0 days.

(21) Appl. No.: 15/270,041

(22) Filed: Sep. 20, 2016

(51) Int. Cl.
  *B60P 7/08* (2006.01)
  *A61G 3/08* (2006.01)
  *B60P 3/06* (2006.01)

(52) U.S. Cl.
  CPC .............. *A61G 3/0808* (2013.01); *B60P 3/06* (2013.01)

(58) Field of Classification Search
  CPC .................. B60P 3/06; A61G 3/0808
  USPC ............ 410/4, 7, 9, 19, 51, 80; 297/DIG. 4; 296/65.04; 248/503.1; 280/304.1
  See application file for complete search history.

(56) References Cited

U.S. PATENT DOCUMENTS

| | | | |
|---|---|---|---|
| 5,388,937 A * | 2/1995 | Farsai | B60P 3/077 410/9 |
| 7,425,110 B2 * | 9/2008 | Ditch | A61G 3/0808 410/19 |

* cited by examiner

*Primary Examiner* — Stephen Gordon

(57) ABSTRACT

A wheelchair docking system comprising a front locking system and a back locking system that locks the wheelchair in place on a solid substrate, such as the floor of a bus.

7 Claims, 7 Drawing Sheets

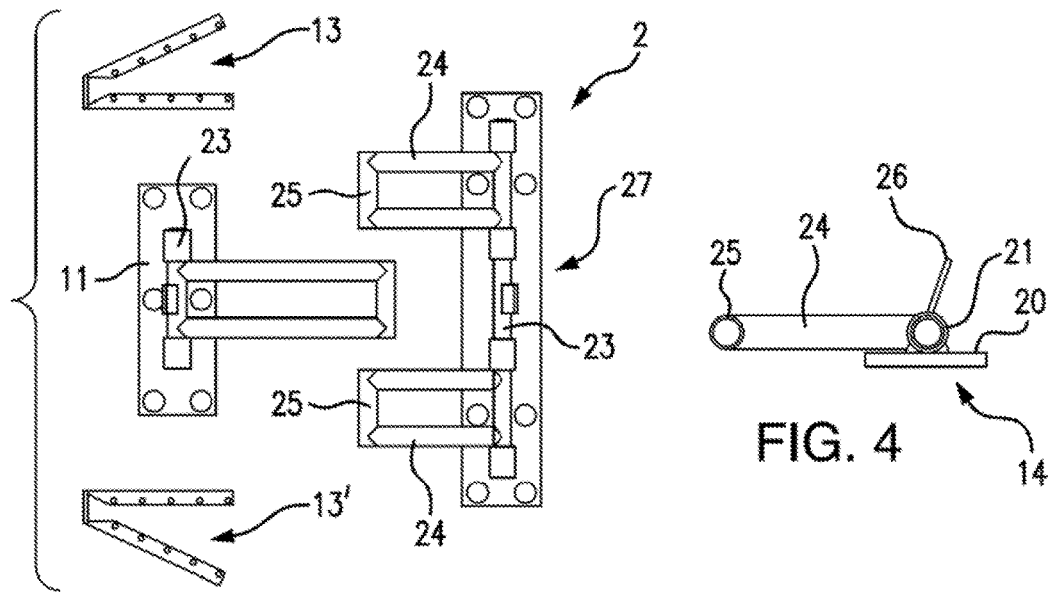
FIG. 3
FIG. 4
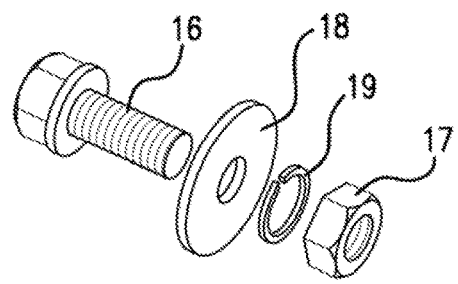
FIG. 5
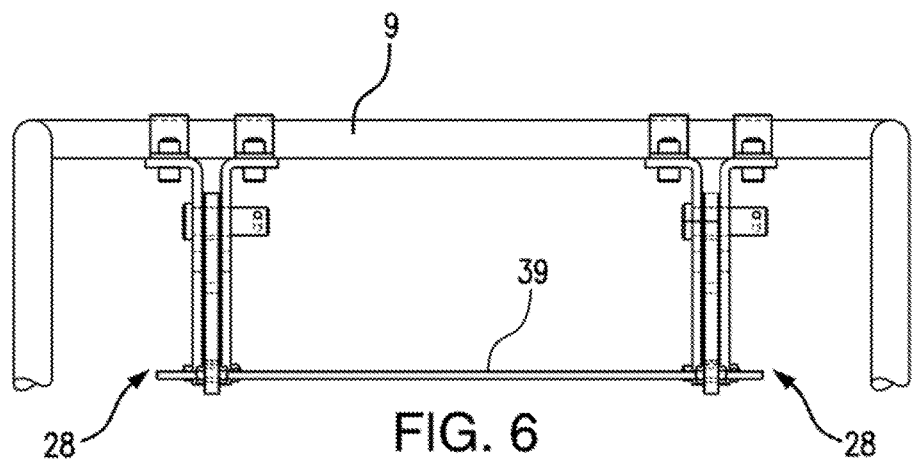
FIG. 6

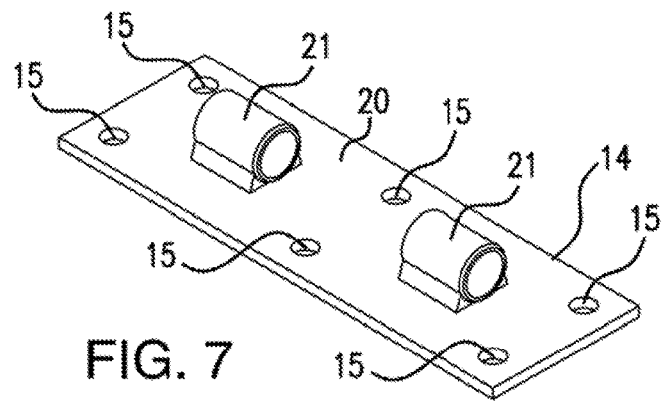
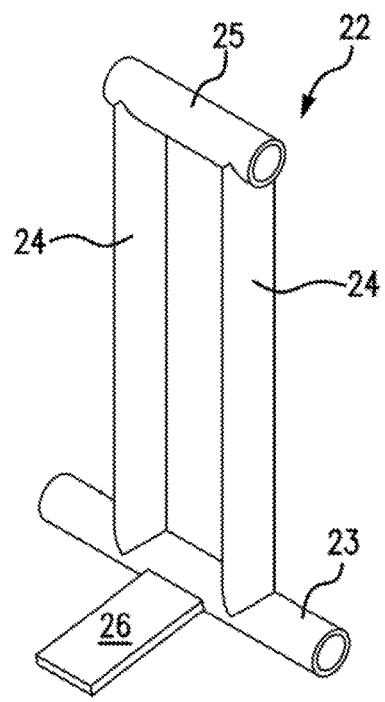
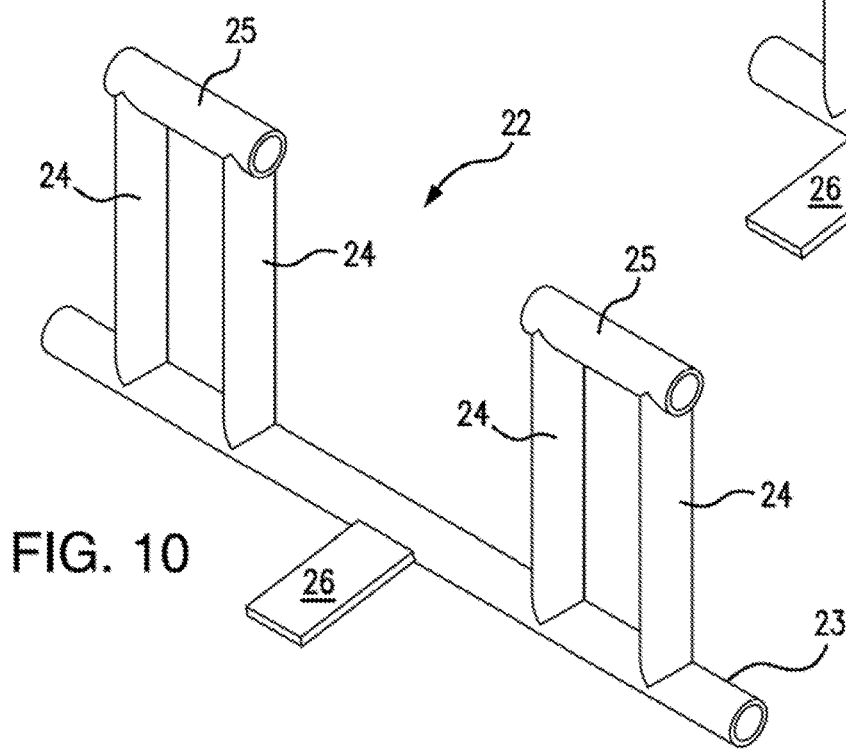

WHEELCHAIR AND WHEELCHAIR DOCKING SYSTEM FOR HUMAN TRANSPORT IN MOTORIZED VEHICLES

BACKGROUND OF THE INVENTION

Docking systems for wheelchairs, and the like, in motorized vehicles, are known in the art. These devices are intended to allow the use of wheelchairs and similar devices to be used in transporting individuals that cannot ride in a standard seat in, for example, public transportation, for example, a bus.

Typically, those types of docking systems are designed for standard wheelchairs and normally, the wheelchairs do not have to be modified to be used in such docking systems.

The ultimate goal in these types of docking systems is safety for the wheelchair person in the event of quick stops, crashes, and the like.

The device of the instant invention includes a new design for a wheelchair and a stronger, tougher, docking system in order to provide the safety eluded to just Supra.

THE INVENTION

Thus, what is disclosed and claimed herein is a wheelchair docking system comprising in combination a front locking assembly comprising a first mounting plate for mounting to a stable surface.

The first mounting plate comprises a first flat plate having a top surface and surmounting the first flat plate, a first round bar rot tably mounted in spaced apart first stanchions.

Each stanchion is securely attached to the top surface of the flat plate. The first round bar has mounted on it a first hook element. The first round bar has mounted near the center of it a first foot pedal and a back locking assembly that comprises a second mounting plate for mounting to the stable surface, aligned with, but spaced-apart from the first mounting plate.

The second mounting plate comprises a second flat plate having a top surface and surmounting the second flat plate there is a second round bar rotatably mounted in spaced-apart second stanchions.

Each second stanchion is securely attached to the top surface of the second flat plate. The second round bar has mounted on it two separated second hook elements. The second round bar has mounted near the center a second foot pedal.

There are locking mechanisms mounted on lower members of a wheelchair that interface with said front and back locking assemblies.

BRIEF DESCRIPTION OF THE DRAWINGS

FIG. 3 is a top view of a typical layout for the substrate locking assembly.

FIG. 4 is an end view of the back stanchion assembly.

FIG. 5 is a typical bolt, nut, and washers used to fix the docking assembly to a stable substrate.

FIG. 6 is a top view of the front locking assembly shown on a partial view of the wheelchair cross bars.

FIG. 7 is a view in perspective of the flat plate used to secure the back locking assembly.

FIG. 8 is a view in perspective of the back stanchion of the locking assembly.

FIG. 10 is a view in perspective of the front stanchion of the locking assembly.

DETAILED DESCRIPTION OF THE DRAWINGS

Figure 1:
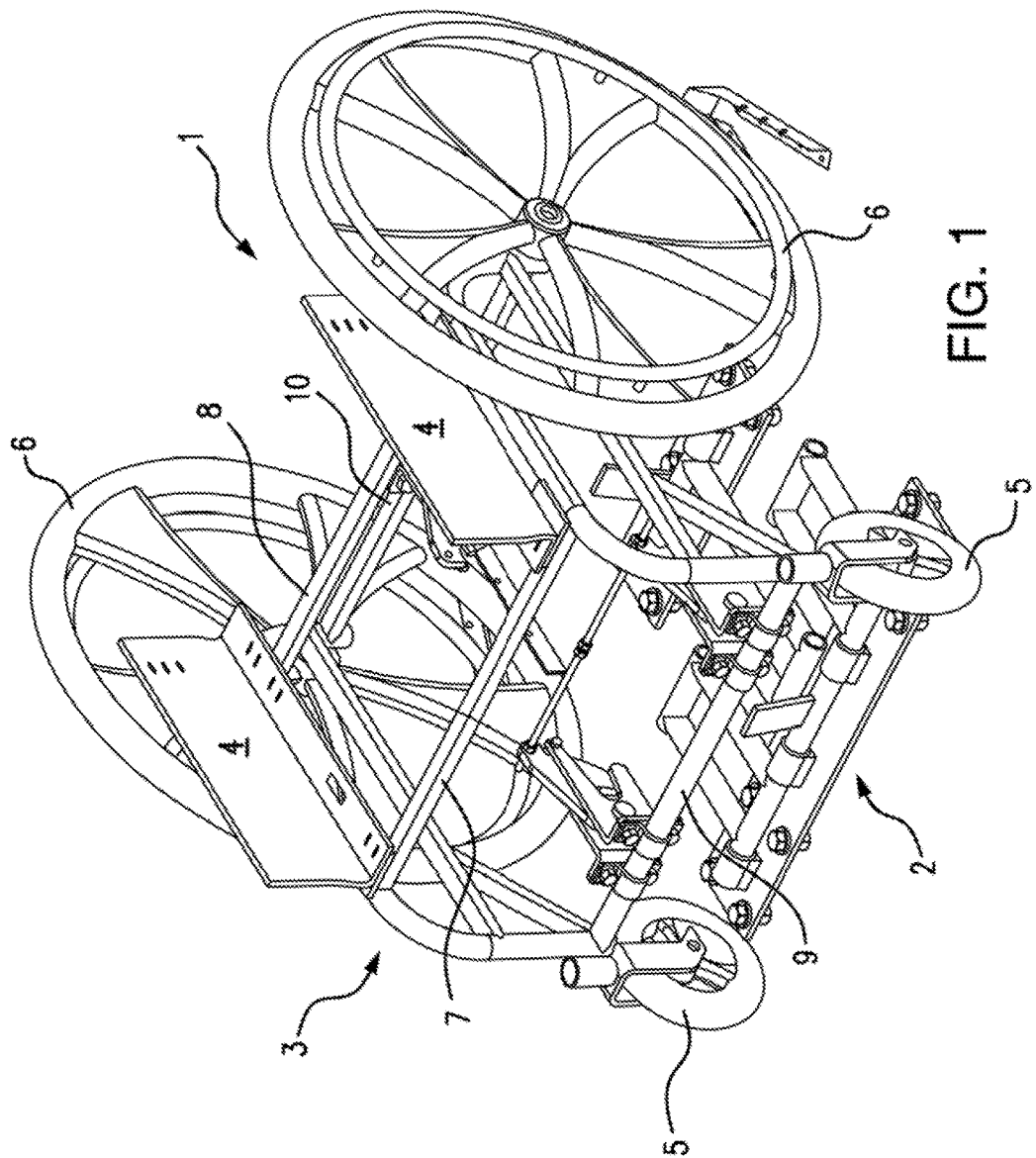
FIG. 1 is full view in perspective of the combination of the wheelchair without seat, and the docking system of this invention.

FIG. 1 is a view in perspective of the combination of a wheelchair 1 and a locking assembly 2 of this invention.

Figure 2:
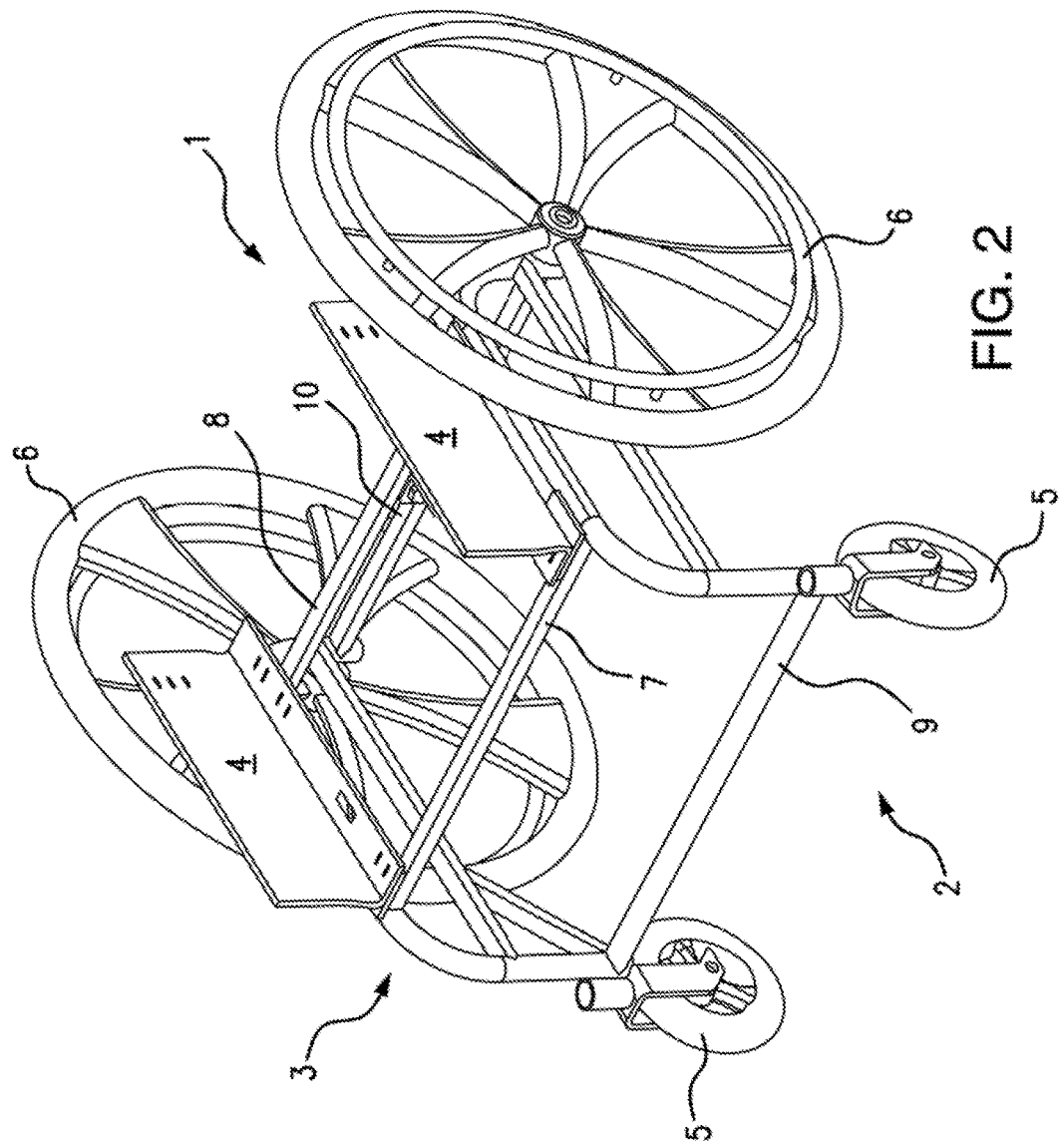
FIG. 2 is a full view in perspective of the wheelchair, without seat, of this invention.

FIG. 2 is a view in perspective of the wheelchair 1 without the seat to show in more detail the makeup of the wheelchair. There is shown a support frame 3 of the wheelchair 1, seat brackets 4, front wheels 5, back wheels 6, upper front cross member 7, upper back cross member 8, front, lower cross member 9, and back lower cross member 10. A novel seat for the wheelchair 1 is discussed infra.

Figure 16:
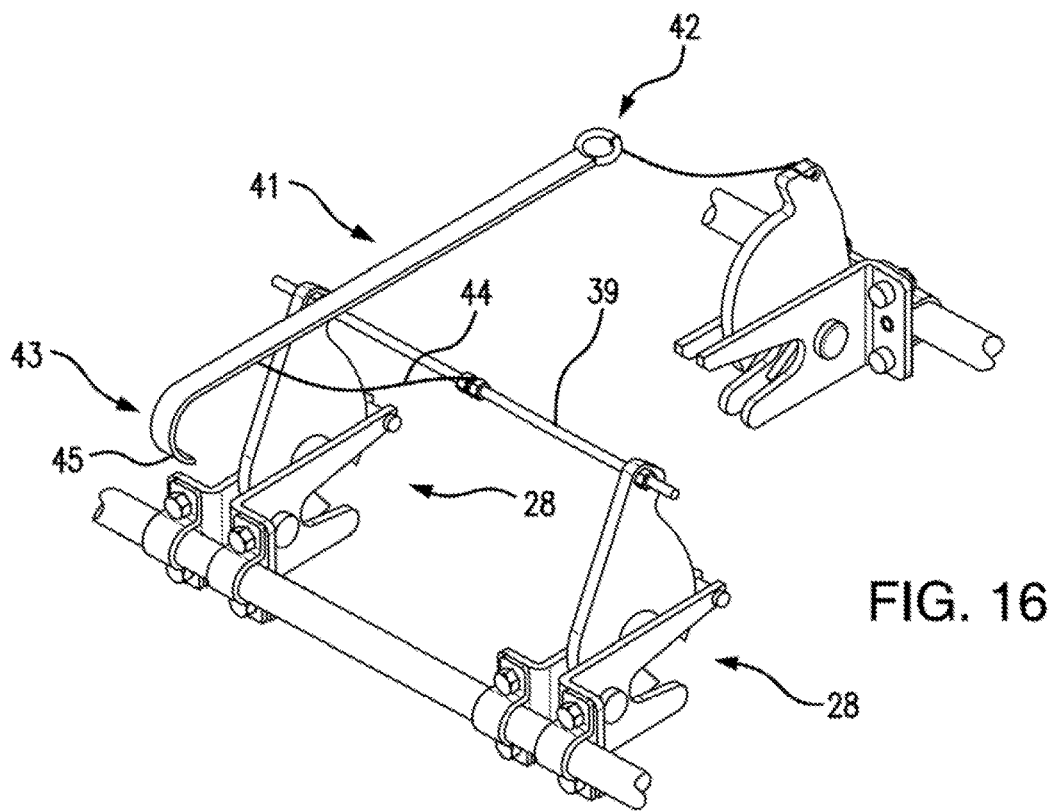
FIG. 16 is a full top view in perspective showing the release mechanism for the locking mechanisms.

Turning now to FIG. 3, which is a top view of a typical layout for the substrate locking assembly 2. There is shown a back locking assembly 11 and a front locking assembly 12. Also shown are the wheel stops 13 and 13'. There is also shown a front locking assembly 27. FIG. 16 is a full top view in perspective showing the release mechanism for the locking mechanisms as set forth in FIG. 3.

Figure 9:
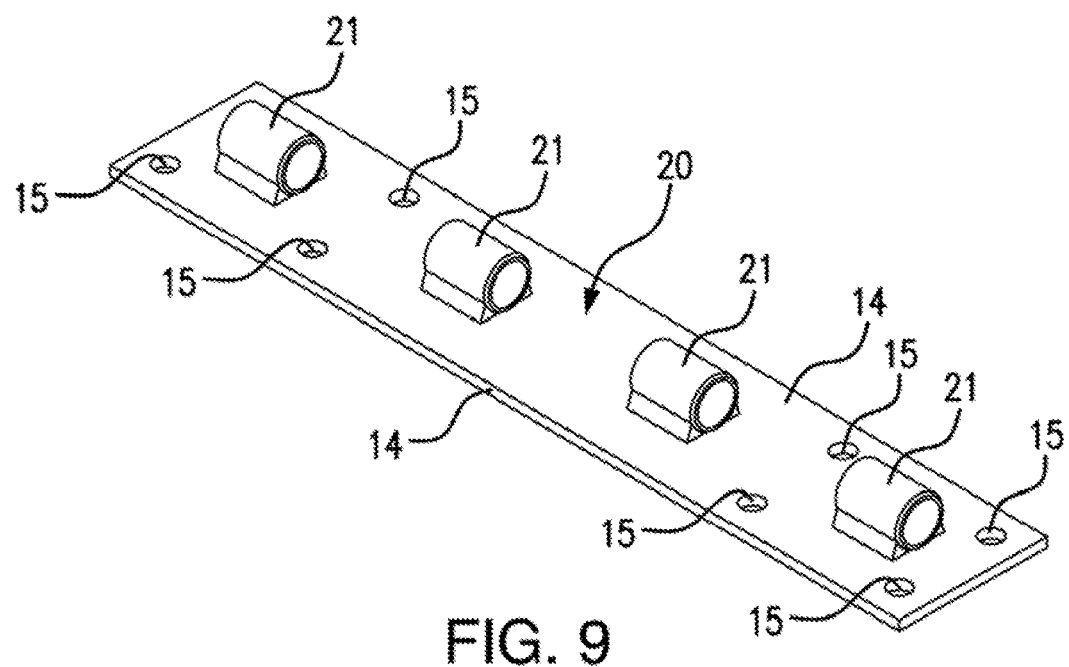
FIG. 9 is a view in perspective of the flat plate used to secure the front locking assembly.
Figure 14:
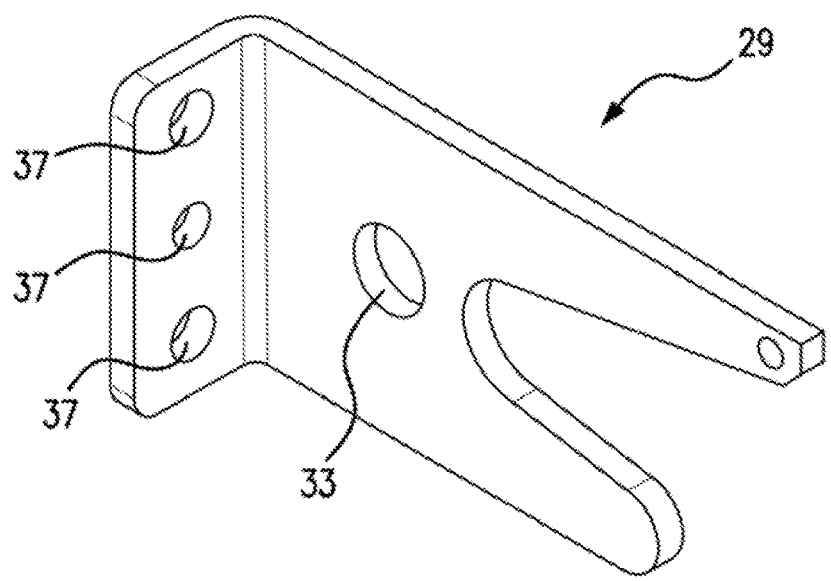
FIG. 14 is a view in perspective of ½ of a clevis hook mount for a locking mechanism of FIG. 11.
Figure 11:
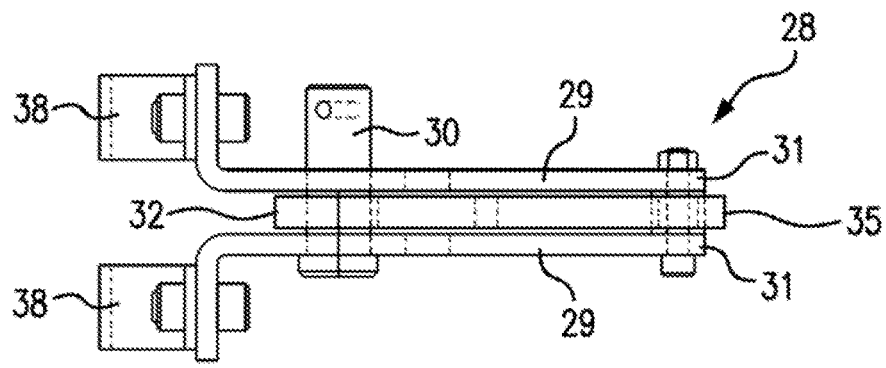
FIG. 11 is a full top view of a locking mechanism of this invention.

Turning now to FIGS. 4, 7, and 9, the back locking assembly 11 is comprised of a floor plate 14 with apertures 15 for fixing the back locking assembly 11 to a solid substrate, such as a bus floor. One suggested fixing means is shown in FIG. 5, which consists of a bolt 16, a nut 17 for the bolt 16, and an arrangement of two washers, a smooth washer 18 and a lock washer 19.

The top surface 20 of the floor plate 14 has fixedly mounted on it spaced-apart stanchions 21 (see FIGS. 7 and 9). Located in the stanchions 21 are the latch bar assemblies 22. Such latch bar assemblies consist of a round base bar 23, that has fixedly attached to it perpendicular round bars 24, which perpendicular round bars 24 and surmounted by a round top bar 25 (a hook element). Centered in the round base bars 23 is a pedal 26 for leveraging the latch bar assemblies 22 from a resting position on the solid substrate to any position. Stepping on this pedal 26, one can activate the locking mechanisms 28 (described in detail infra).

The locking assemblies 11 and 27 are placed on the solid substrate and attached to the solid substrate in accordance with the locking mechanisms 28 (discussed infra) mounted on the support bars of the wheelchair 1. In other words, the locking assemblies 11 and 27 have to be particularly mounted on the solid substrate such that the locking mechanisms 28 of the wheelchair 1 will align and mesh with the latch bar assemblies 22.

Figure 12:
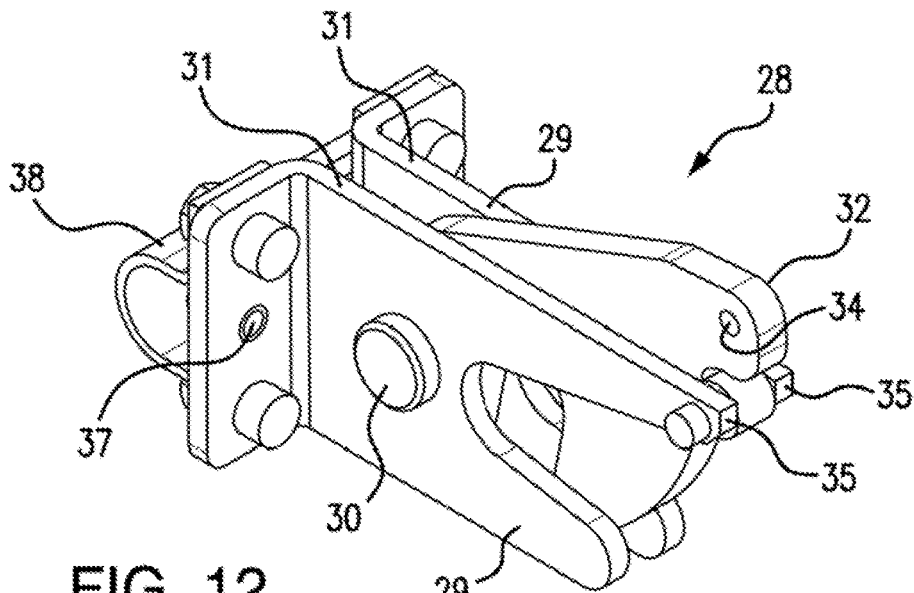
FIG. 12 is a view in perspective of the locking mechanism of FIG. 11.
Figure 13:
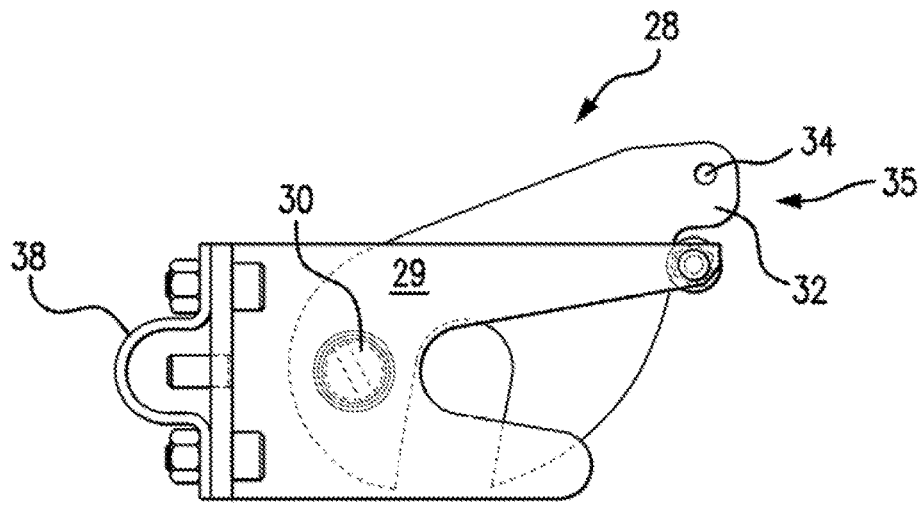
FIG. 13 is a full side view of a locking mechanism of this invention.

FIGS. 6, 10, 11, and 12 illustrate the locking mechanisms 28 wherein FIG. 12 is a view in perspective of a locking mechanism 28 of this invention. There is shown in FIG. 13, a hook mounting arm 29. A pair of the arms 29 are joined by a clevis pin 30 to form a clevis 31. A hook 32 (FIGS. 10 and 12) is mounted rotatably between the arms using the clevis pin 31 through opening 33 (See FIG. 13).

One clevis 31 is mounted to a lower back cross member 10 of the wheelchair 1 and two such clevis's 31 are mounted to a lower front cross member 9 of the wheelchair 1. It should be noted that the hook 32 has a small opening 34 in its leading edge 35. This opening is used to attach a cord or wire 36 fox use in the release mechanism for the locking mechanisms 28. The clevis's 31 are mounted to the cross members of the wheelchair by clamps 38. Openings 37 are provided to allow the use of bolts to affix the clamps 38.

With reference to FIG. 6, there is shown a portion of the release system for the locks mechanisms. Shown is a cross member 10 of the wheelchair, two perpendicular round bars from the wheel chair that support the cross member 10, two locking mechanisms 28 that are clamped to the cross member 10, and a metal rod 39 that ties the two locking mechanisms together.

Figure 15:
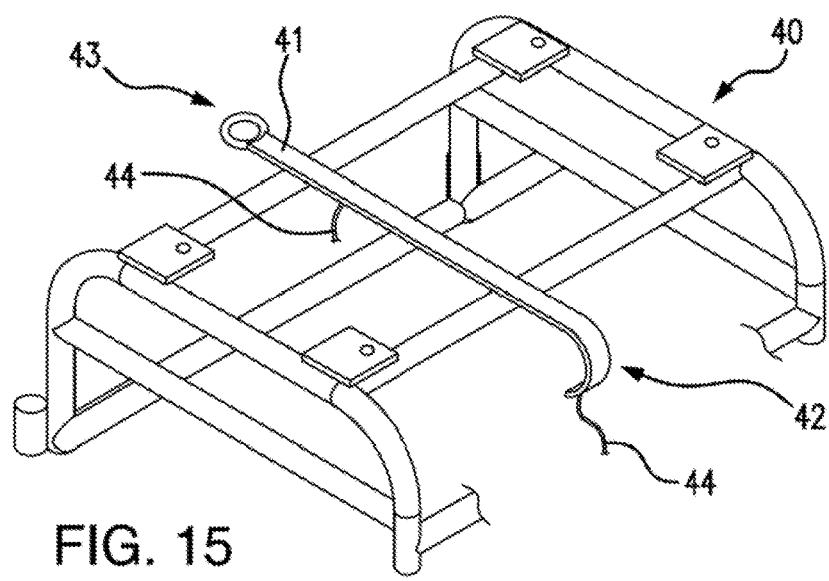
FIG. 15 is a top view in perspective of the frame of the wheel chair seat support.

Further, with reference to FIG. 15, there is shown a top view in perspective of the seat support 40 for the wheel chair 1, showing a strap 41 that has a first end 42 at the back and a second end 43 at the front. The strap 41 at the first end 42 has attached a cord or wire 44 (see FIG. 15) to the end of the strap 41. The strap 41 has another cord or wire 44 attached near the second end 43, but some distance from the second end 43, and the first end 42 of the strap has a loop 45 or some other similar means to grasp the strap 41.

One can pull on the looped end 45, and thereby raise the rod 39 which raises the hooks 32 from their resting place and also raises the hook at the back of the wheelchair. This movement releases all of the hooks 32 of the locking mechanisms and allows them to fall to the solid substrate thereby releasing the wheelchair 1.

What is claimed is:

1. A wheelchair docking system comprising in combination:
   A. a front locking assembly comprising:
      (i.) a first mounting plate for mounting to a stable surface, said first mounting plate comprising:
      (ii.) a first flat plate having a top surface surmounting said first flat plate,
      (iii.) a first round bar rotatably mounted in spaced apart first stanchions, each said stanchion being securely attached to said top surface of said flat plate; said first round bar having mounted thereon,
      (iv.) a first latch element;
         said first round bar having mounted near a center thereof,
      (v.) a first foot pedal, and,
   B. a back locking assembly comprising:
      (i.) a second mounting plate for mounting to said stable surface, aligned with, but spaced-apart from said first mounting plate, said second mounting plate comprising:
      (ii.) a second flat plate having a top surface surmounting said second flat plate,
      (iii.) a second round bar rotatably mounted in spaced-apart second stanchions, each said second stanchion being securely attached to said top surface of said second flat plate; said second round bar having mounted thereon,
      (iv.) two, separate second latch elements,
         said second round bar having mounted near a center thereof,
      (vi.) a second foot pedal;
   C. locking mechanisms mounted on lower members of a wheelchair that interface with said front and back locking assemblies.

2. In combination, a wheelchair docking system as claimed in claim 1 and a lock for said back locking assembly and said front locking assembly, said back locking assembly and said front locking assembly being mounted independently on a front and a back lower cross member on a wheelchair.

3. The combination as claimed in claim 2 wherein, in addition, there is a release mechanism for each said lock.

4. The combination as claimed in claim 3 wherein each said lock comprises a clevis fastener mounted to a cross bar of a wheelchair, said clevis fastener having a tang hook mounted in a clevis using a clevis pin, said clevis fastener comprising:
   a. a U-shaped element having two prongs to form said clevis;
   b. each said prong having a front edge, each said front edge having an elongated slot therein;
   c. said tang hook mounted between said prongs;
   d. said clevis pin holding said tang hook between said U-shaped element prongs, said tang hook having a top edge;
   e. said top edge having an opening therethrough.

5. The combination as claimed in claim 4 wherein said two locks are spaced-apart and there is a common rod located in said opening of each respective tang hook.

6. The combination as claimed in claim 5 wherein there is a strap attached to said rod, near a center thereof.

7. The combination as claimed in claim 4 wherein for one said lock there is a strap attached to said tang hook near a tap edge thereof.

* * * * *